United States Patent
Kirstgen et al.

(10) Patent No.: US 12,454,973 B2
(45) Date of Patent: Oct. 28, 2025

(54) COUPLING DEVICE

(71) Applicant: FRESENIUS MEDICAL CARE DEUTSCHLAND GMBH, Bad Homburg (DE)

(72) Inventors: Udo Kirstgen, Schweinfurt (DE); Johanna Bergmann, Hassfurt (DE)

(73) Assignee: FRESENIUS MEDICAL CARE DEUTSCHLAND GMBH, Bad Homburg (DE)

( * ) Notice: Subject to any disclaimer, the term of this patent is extended or adjusted under 35 U.S.C. 154(b) by 285 days.

(21) Appl. No.: 18/282,547

(22) PCT Filed: Mar. 16, 2022

(86) PCT No.: PCT/EP2022/056785
§ 371 (c)(1),
(2) Date: Sep. 18, 2023

(87) PCT Pub. No.: WO2022/200141
PCT Pub. Date: Sep. 29, 2022

(65) Prior Publication Data
US 2024/0183376 A1 Jun. 6, 2024

(30) Foreign Application Priority Data
Mar. 22, 2021 (DE) .................. 10 2021 107 006.6

(51) Int. Cl.
*F16B 7/22* (2006.01)
*F16B 19/02* (2006.01)

(52) U.S. Cl.
CPC ............... *F16B 7/22* (2013.01); *F16B 19/02* (2013.01)

(58) Field of Classification Search
CPC ............ Y10T 403/61; Y10T 403/7007; Y10T 403/7015; F16B 7/20; F16B 7/22; F16L 21/08; F16L 37/248
See application file for complete search history.

(56) References Cited

U.S. PATENT DOCUMENTS

| 721,427 A | * | 2/1903 | Cope | ..................... E21B 17/046 403/353 |
| 1,171,380 A | | 2/1916 | Arthur | |

(Continued)

FOREIGN PATENT DOCUMENTS

| EP | 0791758 A1 | 8/1997 |
| EP | 2653255 A1 | 10/2013 |

(Continued)

OTHER PUBLICATIONS

Office Action issued in corresponding German Patent Application No. 102021107006.6 dated Nov. 12, 2021 (3 pages).

(Continued)

*Primary Examiner* — Daniel J Wiley
(74) *Attorney, Agent, or Firm* — Kilyk & Bowersox, P.L.L.C.

(57) ABSTRACT

Coupling device (1), which comprises at least two connectable elements in the form of a sleeve (2) and a sleeve holder (3), and the sleeve (2) has, at a first side (a), a recess (4) which is configured on both sides as hooks (5) and is provided with bevelled edges (6), and the sleeve holder (3) has, at a second side (c), a horizontally extending through-pin (7).

19 Claims, 7 Drawing Sheets

(56) References Cited

U.S. PATENT DOCUMENTS

Figure 1A:
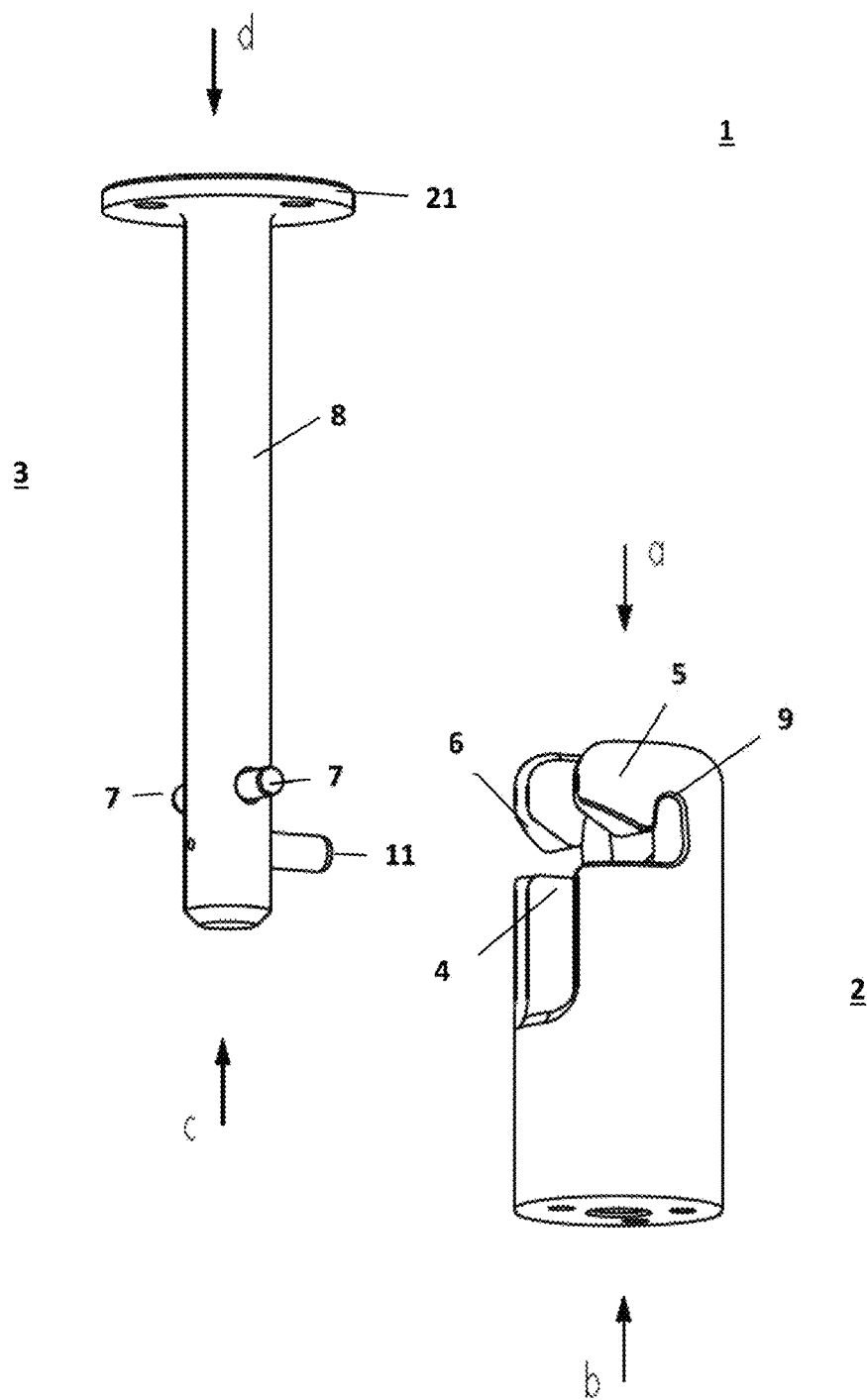

| | | | | |
|---|---|---|---|---|
| 2,630,303 | A | * 3/1953 | Krucker | .......... A01J 25/06 |
| | | | | 248/225.11 |
| 3,688,352 | A | 9/1972 | Gunther | |
| 4,014,219 | A | * 3/1977 | Feustel | .......... B62D 1/192 |
| | | | | 403/353 |
| 5,513,622 | A | 5/1996 | Musacchia, Sr. | |
| 5,655,692 | A | * 8/1997 | Navin | .......... B65G 65/463 |
| | | | | 403/312 |
| 2018/0252052 | A1 | 9/2018 | Attiwell | |
| 2020/0010157 | A1 | 1/2020 | Peterson | |

FOREIGN PATENT DOCUMENTS

| | | |
|---|---|---|
| EP | 3603451 A1 | 2/2020 |
| FR | 2668215 A1 | 4/1992 |
| GB | 1204042 A | 9/1970 |
| GB | 2231363 A | 11/1990 |

OTHER PUBLICATIONS

International Search Report and Written Opinion (with English translation of International Search Report) issued in corresponding International Patent Application No. PCT/EP2022/056785 mailed Jul. 21, 2022 (10 pages).

\* cited by examiner

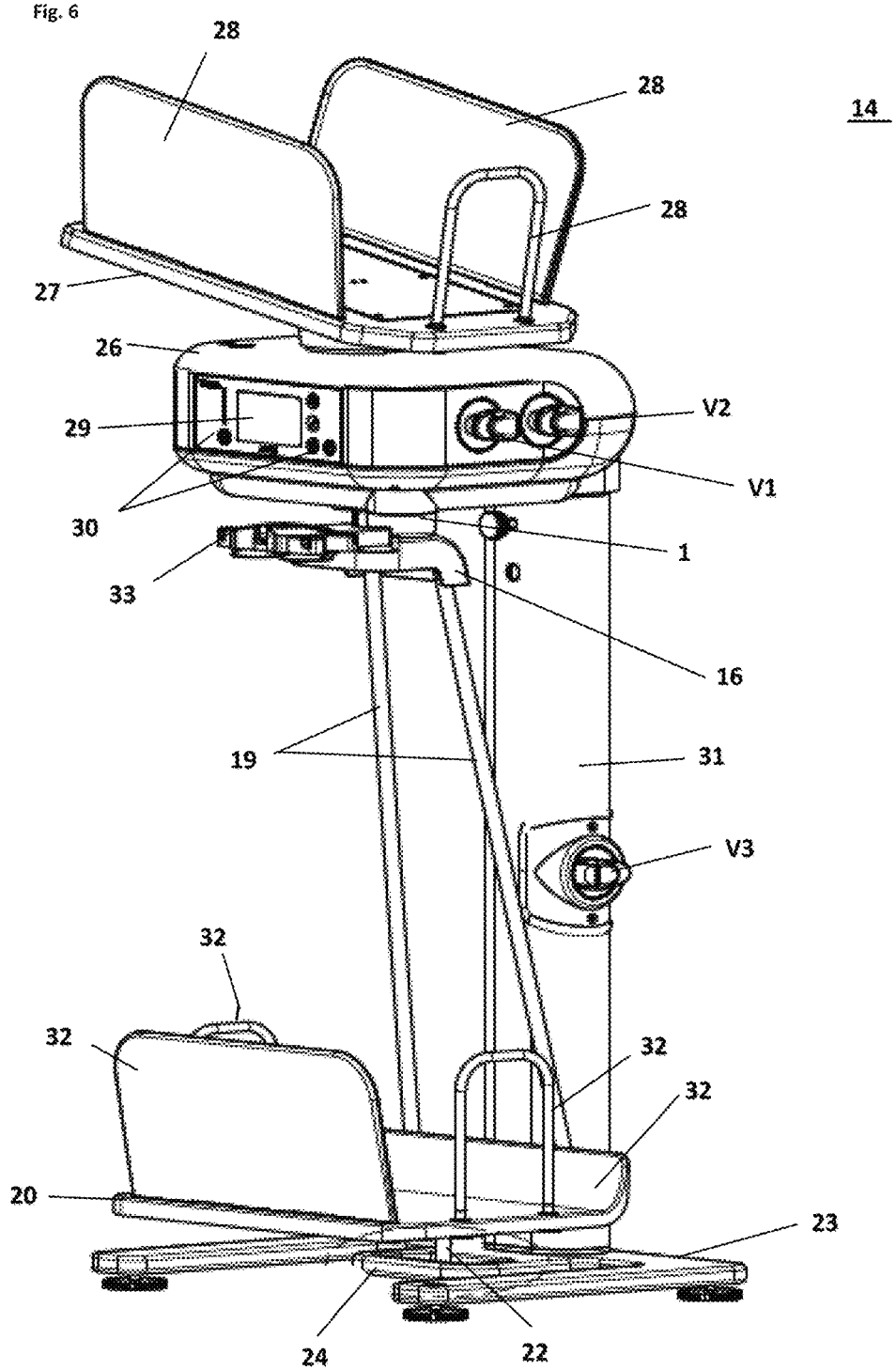

COUPLING DEVICE

This application is a National Stage Application of PCT/EP2022/056785, filed Mar. 16, 2022, which claims priority to German Patent Application No. 10 2021 107 006.6, filed Mar. 22, 2021.

TECHNICAL FIELD

The invention relates to a coupling device for connecting at least two components, wherein the coupling device has at least two elements. For this purpose, the elements for producing the connection are configured in the form of a sleeve and a sleeve holder.

BACKGROUND

When connecting at least two components, there is often the problem that the structural parts are not always easy to handle or, because of their positioning, are not always readily accessible, which can lead to damage at the site of the connection between the components. This damage can result, for example, from the components being jammed together. If the components are connected to further technical structural parts that are coupled via such a connection, damage at the time of assembly can adversely affect the functioning of the apparatus parts. This is particularly critical in the case of precision parts, for example in weighing systems or balancing systems.

It is known from the prior art to screw at least two components together using a screw connection. This in particular entails a receiving device that is connected to a structural part in an apparatus.

During the assembly of the apparatus, the receiving device and the apparatus part must therefore be exactly aligned with each other. Since the receiving device is located below the apparatus housing, this necessitates simultaneous lifting of the receiving device, a colinear orientation of the individual structural parts and the insertion of a screw from overhead. During assembly, the user therefore requires a certain amount of dexterity and strength to screw the structural parts together.

Since not every user manages to screw together the assembly steps while an exact vertical orientation is maintained, this can lead to damage of the screw thread or of the internal thread of the receiving device. If the receiving device is to be fastened to a functional part, for example to a weighing system, incorrect assembly may have a negative impact on the subsequent weighing result. A further disadvantage is that, on account of the connection site being damaged, disassembly, for example for transport and renewed assembly, is no longer possible without destruction and can be effected only with considerable outlay in terms of repairs and is associated with additional costs.

The object of the invention is therefore to make available an improved coupling device that facilitates the connection of at least two components, simplifies assembly and does not cause any damage to the connection site during assembly or disassembly.

This object is achieved by a coupling device having the features of claim 1. Accordingly, provision is made that the coupling device comprises at least two connectable elements in the form of a sleeve and a sleeve holder, wherein the sleeve has, at a first side, a recess which is configured on both sides as hooks and is provided with bevelled edges, and the sleeve holder has, at a second side, a horizontally extending through-pin.

Further advantageous embodiments of the invention are set forth in claims 2 to 14 and in use claim 15, which claims a coupling device in conjunction with a medical apparatus, preferably a weighing or balancing system, particularly preferably a dialysis apparatus.

According to a first embodiment of the invention for simple and damage-free assembly of at least two components or structural parts, the mainly cylindrical sleeve holder has a rod on which the sleeve is suspended. For this purpose, a through-pin is provided which protrudes on both sides of the sleeve holder and which is able to carry the hook-shaped recess of the sleeve. Instead of an individual through-pin, it is likewise possible to use two pins which protrude from the sleeve holder horizontally with respect to each other and at the same height. The reception of the sleeve is in particular promoted by the bevelled edges of the hook-shaped recess since, on account of their configuration, they can slide easily over the through-pin or over the two individual pins of the sleeve holder.

The bevelled configuration of the edges additionally ensures that the sleeve is completely received by the sleeve holder during assembly, since the user senses a "latching" when the through-pin slides over the bevel of the edge into an end position of the sleeve. The sleeve can preferably be round or oval at an upper end position, whereby an end position in which the through-pin is located after correct assembly is unambiguously defined. This first embodiment of the coupling device according to the invention already ensures a simple and comfortable connection via which structural parts or devices can be connected to one another. It is thus possible to avoid screwing from overhead while at the same time having to hold the receiving device, which often leads to a skewed and therefore incorrect assembly.

In a second embodiment of the coupling device according to the invention, the sleeve additionally has an oblong hole which is arranged opposite the hook-shaped recess.

Corresponding to the oblong hole, the sleeve holder has a second pin, which is offset by 90° from the first pin, i.e. the through-pin. This has the advantage that, when connecting the sleeve to the sleeve holder, the second pin can already be oriented such that it is able to slide directly into the oblong hole. This is favoured by the bevelled edges of the hook-shaped recess, which thus predefine an angle. The second pin additionally ensures that a relative movement of the structural parts takes place in a defined manner, since the second pin can only be guided in the oblong hole. If the structural parts are tilted relative to each other, assembly is not possible, since this would cause a collision between the second pin and the sleeve.

Optionally, a bracing device can be provided at a first end of the sleeve arranged opposite the hook-shaped recess. At this end, the sleeve can have a thread, preferably an internal thread, for receiving a clamping screw. By means of this clamping screw, the sleeve holder can be pretensioned against the sleeve, and the stiffness of the connection can thus be comfortably and easily increased or adjusted. This represents a possible option in which the screwing-in depth of the clamping screw can be kept small, since the screw is used only for clamping and not for the transmission of a bending moment.

In a preferred embodiment, the coupling device can function as a binding member between one or more components that can be mounted at at one free end of the coupling device. The free ends of the coupling device correspond to the first end of the sleeve and the second end of the sleeve holder, which are each arranged distally with respect to the connection site between sleeve and sleeve holder.

This first free end of the coupling device is thus identical to the first end of the sleeve that is arranged opposite the hook-shaped recess. For the connection of the coupling device to a further component, for example to a receiving device, at least one bore can be provided in the first end of the sleeve. This bore can be configured in the form of a plug connection or of a further thread, for firmly connecting the receiving device to the sleeve. However, any other possibility of mounting a component on the first free end of the coupling device is also conceivable.

The receiving device comprises a flexible film or preferably a linkage system with a shelf and/or one or more receiving vessels which are inserted at the lower end of the receiving device or are connected to the linkage system.

The shelf and the one or more receiving vessels can be configured in the form of a tray, a bowl, one or more containers, bags, preferably solution bags or the like. Or the receiving vessels can be placed on the shelf.

Preferably, at the interface to the first free end of the sleeve, the receiving device can already be integrally connected to the sleeve by means of a plug connection at the time of manufacture. In particular, the plug connection can be a constituent part of the receiving device that carries the linkage system. Thus, the receiving device and the sleeve can constitute one unit for connection to the sleeve holder. However, it is also conceivable that the user first of all has to connect the receiving device to the sleeve via the plug connection.

Similarly, the second end of the coupling device can also be connected to at least one further component or to at least one further structural part. The second free end of the coupling device is the end of the sleeve holder opposite the connection site to the sleeve. The second end is configured such that, for example, a fastening element can be provided in order to fasten the sleeve holder preferably to a rigid surface, such as a housing or a functional apparatus part. The apparatus part can be, for example, a weighing or balancing device. However, other components or structural parts are also conceivable, for example sensors or the like.

Preferably, the second free end of the coupling device is already mounted on a structural part of an apparatus, such that they form a further unit, and the sleeve, preferably together with the receiving device, then only needs to be hooked on. In this way, using the coupling device as binding member, several components can be assembled quickly, safely, easily and without damage.

If the apparatus parts are functional parts, it is possible to safely avoid assembly-related impairment or incorrect operation of the functional parts. The functional parts can preferably be one or more balances, weighing cells, piezo elements or the like.

The two elements of the coupling device (sleeve and sleeve holder) can be connected to or hooked onto each other flexibly and/or releasably.

Against this background of the invention, the coupling device, for connecting at least two structural parts, can be used in weighing or balancing systems, medical apparatuses, in particular dialysis apparatuses, preferably for haemodialysis or peritoneal dialysis.

The peritoneal dialysis apparatuses can be automated peritoneal dialysis cyclers (APD), which use pumps (roller pumps, diaphragm pumps or the like) to transport fluid, and also gravimetric or semi-gravimetric peritoneal dialysis cyclers or systems (CAPD), in which fluid is transported entirely or partially by gravity. These apparatuses or systems are often equipped with balancing and/or weighing devices.

It goes without saying that the coupling device according to the invention can also be used for any other desired connection of structural parts or articles.

In a preferred embodiment, the coupling device is a constituent part of a gravimetric peritoneal dialysis cycler. These have, for example, at least one apparatus housing, at least one heating shell, at least one apparatus housing support, at least one receiving device with a receptacle and/or a vessel, a device for simple handling of the hose connections (organizer) and at least one support base.

In an extended embodiment, a third pin is mounted preferably on the underside of the receptacle or of the vessels of the receiving device.

The third pin can be operatively connected to the coupling device in such a way that, by means of a further apparatus part, preferably a support base of an apparatus, it can limit an oscillating movement of the receiving device.

For this purpose, a cutout can be provided in the base of the cycler. The third pin can be inserted into this cutout during assembly. Through the limitation of the oscillating movement, it is possible for the receiving device to swing out quickly into the rest position, thus permitting a rapid start of treatment. Moreover, this arrangement serves as an additional means of protecting the apparatus or a weighing system against damage if an inadmissible force acts on the receiving device.

By virtue of the cutout in the support base and the bevelled edges of the hook-shaped recess, a corresponding guidance of the whole receiving device with the sleeve is predefined when hooked in the sleeve holder, such that the third pin is transferred directly into the cutout of the support base.

This arrangement also helps to achieve proper assembly and thus correct functioning of the apparatus, in particular of the functional that are connected to one another via the coupling device according to the invention.

Furthermore, the coupling device according to the invention is used in a weighing or balancing system, a medical apparatus, preferably a dialysis apparatus.

The coupling device according to the invention is explained in more detail below with reference to the drawings, in which:

FIG. 1a shows a perspective side view of the two elements of a coupling device

Figure 1B:
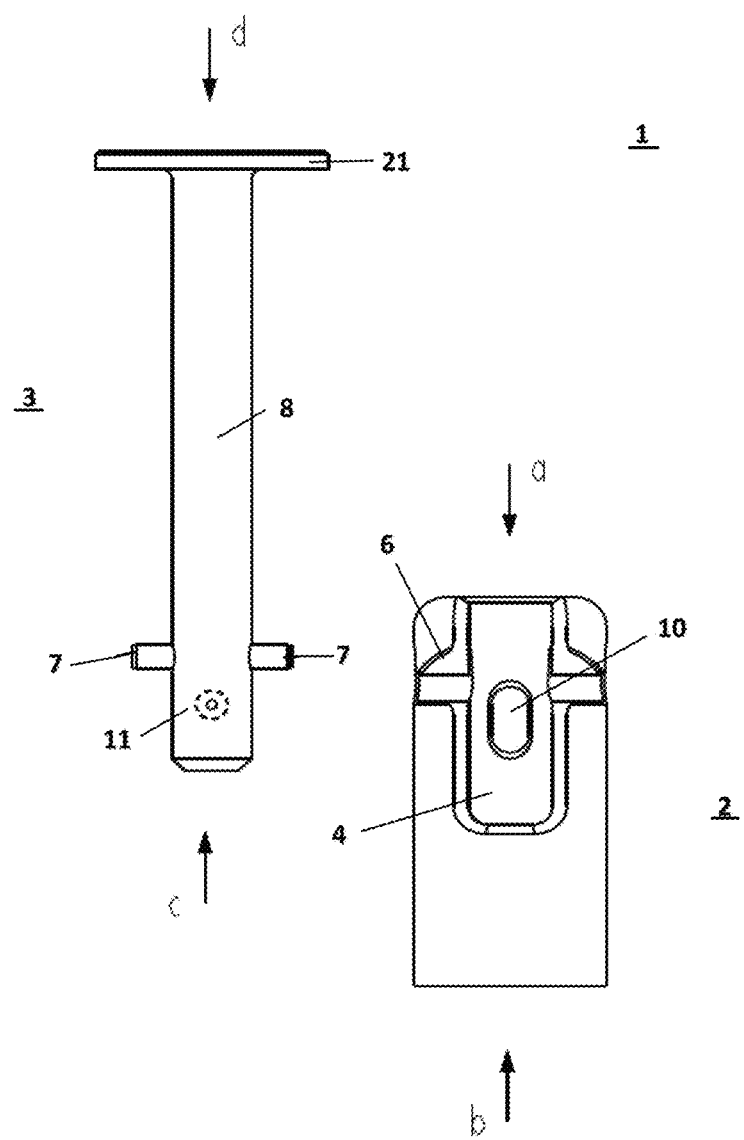
Figure 2:
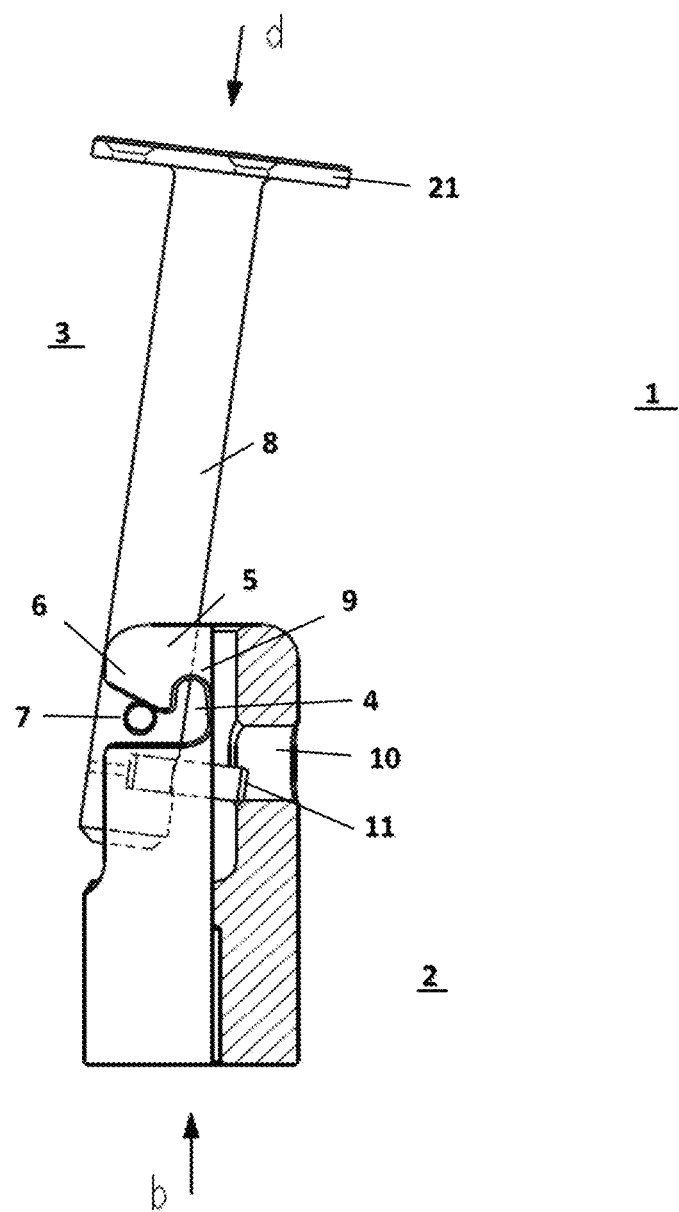
Figure 3:
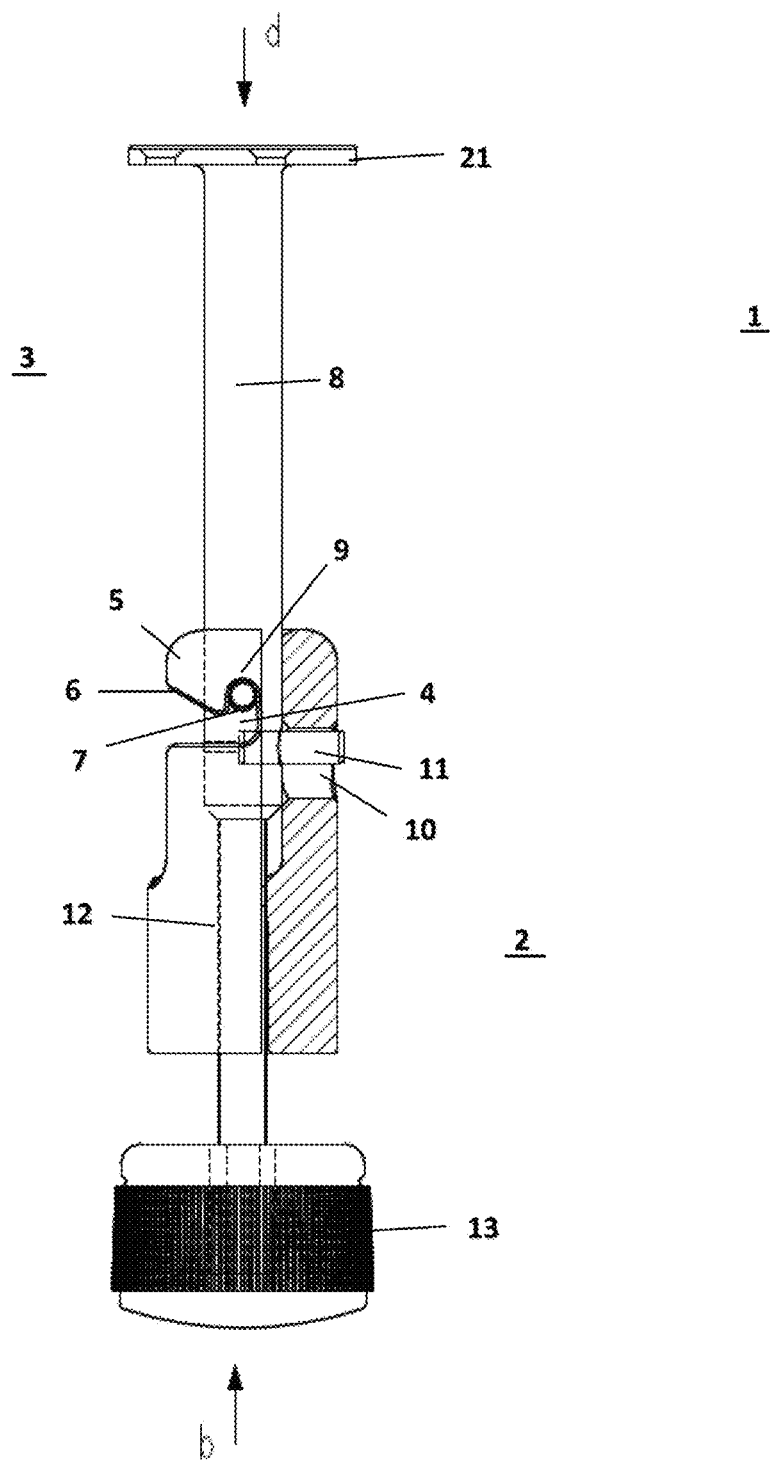
Figure 4:
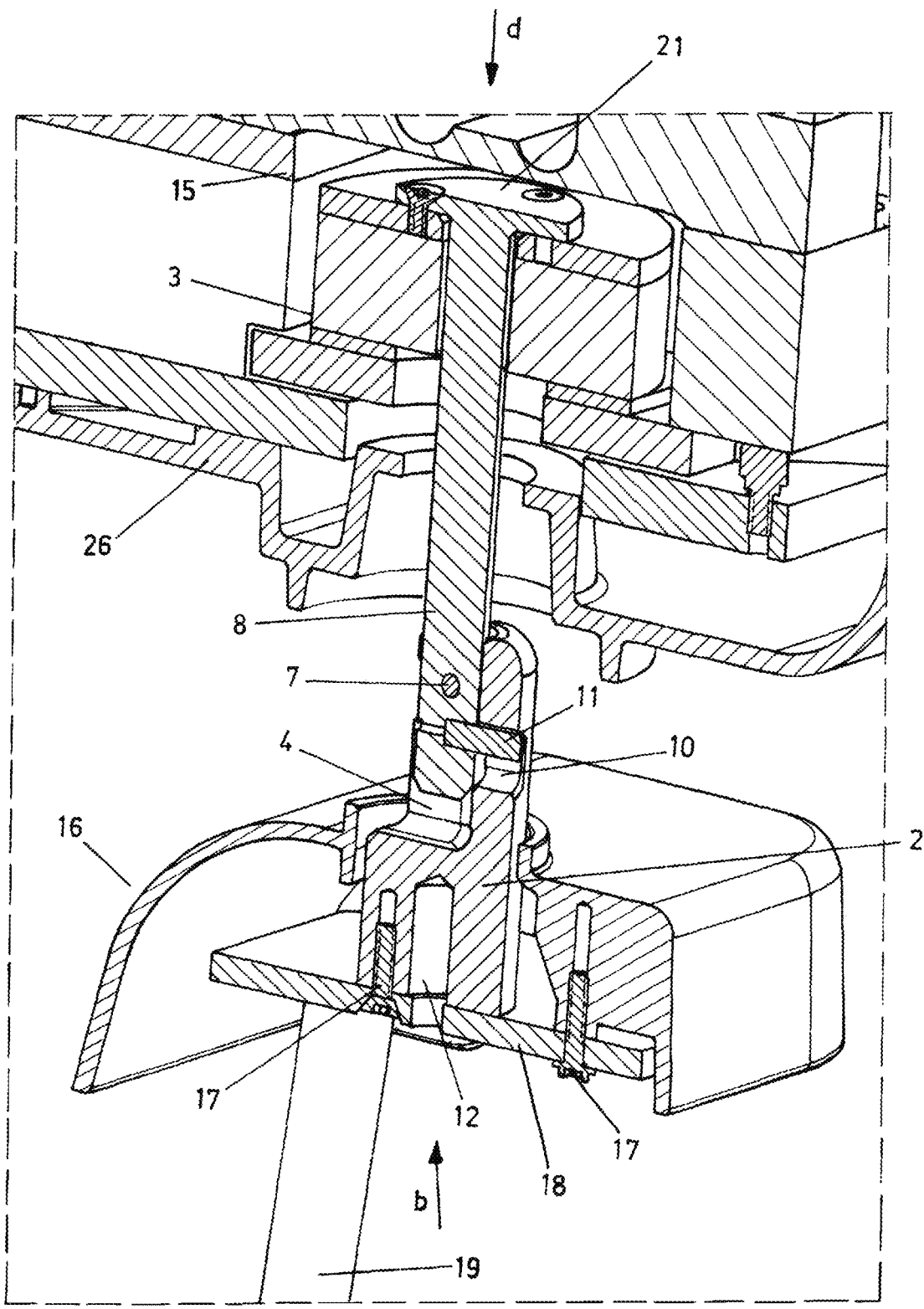
Figure 5:
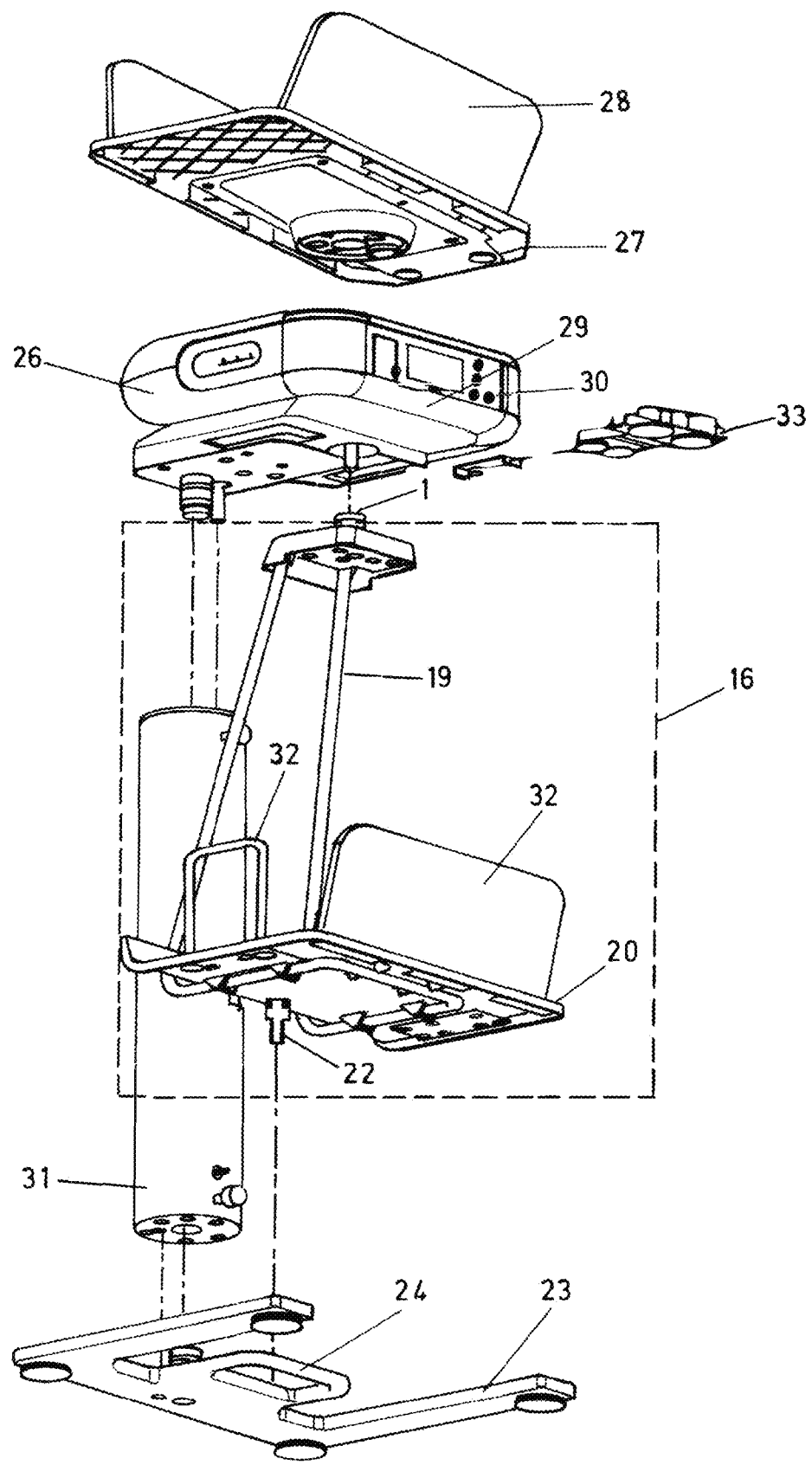

FIG. 1b shows a perspective front view of the two elements of a coupling device with an oblong hole FIG. 2 shows a perspective side view of the two elements of a coupling device upon connection/hooking together of sleeve and sleeve holder FIG. 3 shows a perspective side view of the two connected elements of a coupling device with a clamping screw FIG. 4 shows a sectional view of the coupling device bound to further components via the free ends of the coupling device FIG. 5 shows an exploded view of a cycler, in particular of the receiving device with third pin and support base FIG. 6 shows a perspective view of a peritoneal dialysis apparatus.

FIG. 1a shows a perspective side view of the two elements of a coupling device (1). The coupling device (1) comprises at least two connectable elements in the form of a sleeve (2) and a sleeve holder (3). At a first side (a), the sleeve (2) has a recess (4) which is configured on both sides as hooks (5) and is provided with bevelled edges (6). Corresponding to the sleeve (2), the sleeve holder (3) has, at a second side (c) thereof, a through-pin (7) which extends horizontally through a rod (8) of the sleeve holder (3) and protrudes on both sides of the rod (8). Instead of a through-pin (7), two individual pins can also be provided on both sides, which pins are mounted at the same height and linearly with respect to the two sides of the rod (8). The through-pin (7) or the individual pins are preferably cylindrical.

To easily and safely hook the sleeve (2) to the sleeve holder (3), the edges (6) of the hook-shaped recess (4) are bevelled, their clear width decreasing from the outside of the sleeve (2) towards the hooks (5). The bevel can assume an angle of 10 to 45°, preferably 20 to 40° or particularly preferably 30°.

The sleeve (2) is therefore able to slide along the bevelled edges (6) over the through-pin (7) and can latch in an upper end position (9) of the hook-shaped recess (4). Matching the through-pin (7), this upper end position (9) is round or oval. In this way, the sleeve (2) is held safely in the sleeve holder (3); the end position (9) in which the through-pin (7) is located after correct assembly is thus unambiguously defined, and the coupling device (1) is secured against inadvertent release of the connection.

In an extended embodiment, as shown in FIG. 1b, an oblong hole (10) can be provided at that side of the sleeve (2) directed away from the hook-shaped recess (4). As a counterpart, the sleeve holder (3) has a second pin (11), which is arranged on the rod (8) below the through-pin (7) and offset by 90° from the latter. This second pin (11) ensures that the coupling of the sleeve (2) and of the sleeve holder (3) always takes place in the same orientation or at a fixed angle. By such a configuration of the two elements, it is possible to safely avoid a situation where structural parts connected to one another via the coupling device (1) become jammed upon assembly. The bevelled edges (6) also help here, since they already predefine a guide.

FIG. 2 shows a perspective side view of the two elements of a coupling device (1) during the connection/hooking together of sleeve (2) and sleeve holder (3). It will be seen particularly clearly here how the sleeve (2) and the sleeve holder (3) interact and in particular how the second pin (11) of the sleeve holder (3) is guided via the bevelled edges (6) into the oblong hole (10).

FIG. 3 shows a perspective side view of the two elements (2, 3) of the coupling device (1) after the coupling. In addition, in a further embodiment, a bracing device can be provided at the first end (b) of the sleeve (2). For this purpose, the sleeve (2) has, at its first end (b), a bore (12) with a thread for the screwing in of a clamping screw (13). The thread is preferably an internal thread. As a bracing device, all further embodiments can be used that allow the stiffness of the coupling device (1) to be adjusted. A latch mechanism, for example, would also be conceivable.

As has already been described above, the coupling device can constitute a binding member between further components or structural parts that can be applied at at least one of the free ends (b, d) of the coupling device (1). An illustrative embodiment is shown in the sectional view in FIG. 4, in which the coupling device (1) is integrated between at least two further components. In particular, these components can be apparatus parts or devices.

At least one further component, in this example a receiving device (16), can be coupled to the first free end (b) of the coupling device (1), which end (b) is formed by the first end of the sleeve (2) arranged opposite the hook-shaped recess (4). The free end (b) has at least one further bore or thread (17) for the connection of the receiving device (16). The receiving device (16) comprises a linkage system (19), at the lower end of which a shelf is inserted. The bags for receiving the drain fluid are placed on the shelf.

As can likewise be seen from FIG. 4 and has already been mentioned above, at least one further component or structural part can also be coupled to the second end (d) of the coupling device (1). The second free end (d) of the coupling device (1) is the second end of the sleeve holder (3) opposite the site of connection to the sleeve (2). The end (d) is configured such that, for example, a fastening element (21) is provided for mounting on a weighing device (15), here on a damper of a weighing device with a weighing cell. The free end (d) and the weighing device (15) can be connected by screwing, adhesive bonding, welding, locking, suspension, etc., or can already be integrally connected to the free end (d).

The coupling device (1) according to the invention is characterized in particular in that the sleeve (2) and the sleeve holder (3) permit a certain flexibility during assembly and can be connected or hooked onto each other releasably, which greatly simplifies assembly and disassembly and can also compensate for a certain oscillating movement of the receiving device (16).

FIG. 5 shows, as has already been mentioned, the support base (23) of an apparatus, which can preferably be U-shaped in order to ensure a secure stand. The support base (23) additionally has a preferably rectangular cutout (24). A third pin (22) or the like, which is mounted on the underside of the shelf (20) of the receiving device (16), can be inserted into this cutout (24). In this embodiment, the shelf (20) is held by the linkage system (19). By virtue of the design of the coupling device (1) according to the invention and the interaction between the sleeve (2) and the sleeve holder (3), the third pin (22), in the attachment procedure, is already oriented such that it fits directly into the cutout (24) of the support base (23). In this way, the third pin (22) is in direct operative connection with the coupling device (1).

To give the reader an impression of how the coupling device (1) according to the invention can be embedded in an apparatus and interacts with the various components of the apparatus, FIG. 6 shows a gravimetric peritoneal dialysis cycler (14).

The peritoneal dialysis apparatus (14), comprising an apparatus housing (26) accommodating the electronics needed for operating the apparatus, for example open-loop and closed-loop control units, and also the display (29) and/or control units (30). An organizer (33) mounted on the apparatus housing (26) permits simple handling for producing the fluidic connections between the patient, solution bag and drainage bag.

A heating shell (27), above the apparatus housing (26), is connected directly to the latter in order to receive at least one solution bag containing fresh dialysis solution that is to be delivered to the patient. The heating shell (27) also has side parts (28) for stabilizing the solution bag. The heating shell is likewise connected to the weighing devices in order to balance the dialysate in the solution bag (s).

On the underside of the apparatus housing (26) or on a weighing device (15), a receiving device (16) is attached to the apparatus by means of the coupling device (1) according to the invention, comprising a linkage system (19) and a shelf (20) for at least one drainage bag into which passes the spent drain fluid originating from the patient. The linkage system (19) extends from the rear face of the shelf (20) upwards to the underside of the apparatus housing (26). The shelf (20) thus serves at the same time as a weighing shell.

Moreover, the shelf (20) likewise has side parts (32) in order to secure the drainage bags against slipping.

The side parts (28, 32) of the heating shell (27) and also of the shelf (20) can be secured by plug connections or can be pivotable relative to the support surface, such that the bags can be comfortably inserted and removed.

The apparatus housing (26) is secured on a vertically extending apparatus housing support (31) in the form of a support column, the lower end of which is adjoined by a support base (23). The support base (23) is preferably U-shaped and has a rectangular cutout (24), which protrudes from the transverse side into the U-shaped region. The third pin (22) engages in this cutout since, upon assembly of the sleeve (2) and the sleeve holder (3), and on account of its special geometry, it is already oriented such that it slides over the edge of the rectangular recess (24).

The peritoneal dialysis apparatus (14) is further configured to receive a hose system (not shown), wherein the hose system comprises at least three line sections for connection to at least one drainage bag, at least one solution bag and a patient. For the fluidic connection between the at least one solution bag and the patient, the valves (V1) and (V2) are provided on the apparatus housing (26), and also a drainage valve (V3) which on the housing support (31) for the fluidic connection between the patient and the solution bags and the at least one drainage bag.

The weight of the solution bags and/or of the drainage bags, which are located on the shelf (20) of the receiving device (16) or the heating shell (27), is detected by means of the weighing system (15), which can have one or more weighing cells, and transmitted to a processor and stored for further data processing. This can be a processor within the apparatus (14) or an external apparatus to which the measurement data are transmitted by wire or wirelessly and are stored for further data processing.

The invention claimed is:

1. A coupling device comprising at least two connectable elements in the form of a sleeve and a sleeve holder wherein the sleeve has, at a first side, a recess which is configured on both sides as hooks and is provided with bevelled edges, and the sleeve holder has, at a second side, a horizontally extending through-pin;
wherein the sleeve has an oblong hole which is arranged opposite the hook-shaped recess, and the sleeve holder has, below the through-pin, a second pin offset by 90° from the through-pin, which is configured to engage with the oblong hole.

2. The coupling device according to claim 1, wherein the clear width between the bevelled edges of the hook-shaped recess decreases from the outside of the sleeve towards the hooks and thus assumes an angle of 10 to 45°.

3. The coupling device according to claim 1, wherein the hook-shaped recess of the sleeve latches in an upper end position.

4. The coupling device according to claim 1, wherein the sleeve has, at a first end, a bracing device which is configured as a thread for receiving a clamping screw.

5. The coupling device according to claim 1, wherein the coupling device constitutes a binding member between one or more components that are capable of being mounted at at least one of the free ends of the coupling device.

6. The coupling device according to claim 1, wherein the coupling device, at the first free end formed by the sleeve, has at least one bore or thread for connection to a further component.

7. The coupling device according to claim 1, wherein the receiving device comprises a flexible film or a linkage system with a shelf and/or one or more receiving vessels.

8. The coupling device according to claim 1, wherein at a second end of the coupling device formed by the sleeve holder, a fastening element is provided for mounting on a rigid surface.

9. The coupling device according to claim 1, wherein the coupling device is connected to at least one weighing device.

10. The coupling device according to claim 1, wherein the sleeve and the sleeve holder of the coupling device are configured to be connectable to each other flexibly and releasably.

11. The coupling device according to claim 1, wherein a third pin, which is operatively connected to the coupling device, is mounted on the underside of the shelf or of the receiving vessels of the receiving device.

12. The coupling device according to claim 11, wherein the third pin is operatively connected to the coupling device with a further apparatus part.

13. A medical apparatus comprising the coupling device of claim 1.

14. The medical apparatus of claim 13, wherein the medical apparatus is a dialysis apparatus.

15. The coupling device according to claim 1 wherein the clear width between the bevelled edges of the hook-shaped recess decreases from the outside of the sleeve towards the hooks and thus assumes an angle of 20 to 40°.

16. The coupling device according to claim 1, wherein the hook-shaped recess of the sleeve latches in an upper end position, which is round or oval.

17. The coupling device according to claim 1, wherein the coupling device, at the first free end formed by the sleeve, has at least one bore or thread for connection to a further component that is a receiving device.

18. The coupling device according to claim 1, wherein at a second end of the coupling device formed by the sleeve holder, a fastening element is provided for mounting on a rigid surface that is an apparatus housing or apparatus part.

19. The coupling device according to claim 1, wherein the coupling device is connected to at least one weighing device that is at least one balance, weighing cell or piezo element.

* * * * *